United States Patent Office 3,031,467
Patented Apr. 24, 1962

---

3,031,467
NON-HYGROSCOPIC 2 - DIMETHYLAMINOETHANOL SALT AND METHODS OF PREPARING SAME
Ryuichi Yamamoto, Ashiya-shi, Hiroyoshi Tanaka, Hirakata-shi, Osaka, and Mitsunori Takehara, Nishinomiya-shi, Japan, assignors to Shionogi & Co., Ltd., Osaki-shi, Japan
No Drawing. Filed Sept. 30, 1959, Ser. No. 843,341
Claims priority, application Japan Oct. 2, 1958
5 Claims. (Cl. 260—395)

This invention relates to a novel salt of 2-dimethylaminoethanol and particularly relates to a non-hygroscopic salt of 2-dimethylaminoethanol with phenolphthalin (2-dimethylaminoethanol 4′,4″-dihydroxytriphenylmethane-2-carboxylate).

Known compounds having effectiveness in improvement of depression and nervous exhaustion are amphetamine (1-phenyl-2-aminopropane), pipradrol (α-(2-piperidyl)-benzhydrol), 2-dimethylaminoethanol and the like. Amphetamine has the drawback of producing increased tension, insomnia and reduced appetite in many patients. Pipradrol has fewer side-reactions but is usually less effective than amphetamine. While 2-dimethylaminoethanol has no side-reactions and is effective enough, it is liquid so that it is suitable for making liquid preparations such as injections but is unsuitable for making solid preparations such as powders and tablets. Accordingly, 2-dimethylaminoethanol is used in solid preparations in the form of one of its salts, such as the hydrochloride and the bitartrate. However, these salts are extremely hygroscopic, making it unpleasant to handle in manufacturing operations. Owing to the extreme hygroscopicity of these known salts, they attract moisture to preparations containing them to the extent that in some cases the powdered material is transformed into a paste which makes it impossible to handle in powder measuring devices, in weighing operations and the like.

Attempts have been made to obtain other salts which are less hydroscopic than are the known salts stated above, for example, 2-dimethylaminoethanol p-acetylamino benzoate. The product, however, is more hydroscopic than desirable, and there is a need for a better product for pharmaceutical manufacturing operations.

The present invention provides an improved, less hygroscopic 2-dimethylaminoethanol salt, which is a free flowing powder even at high relative humidities, and it can be handled by ordinary measuring and encapsulating equipment without special precautions being required on account of the humidity.

The new non-hygroscopic salt of the present invention may be represented by the following formula:

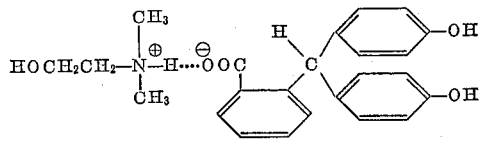

The new salt is prepared by reacting 2-dimethylaminoethanol with phenolphthalin in a proper medium. Usually, it may be obtained by reacting the water-soluble salt of 2-dimethylaminoethanol such as the hydrochloride with a water-soluble salt of phenolphthalin such as the sodium salt in an aqueous medium or reacting 2-dimethylaminoethanol with phenolphthalin in an organic solvent, and then collecting the crystalline precipitate. The product is sufficiently pure without recrystallization.

The new salt is white, crystalline powder being very slightly soluble in water or organic solvents such as methanol, ethanol, acetone, ether, benzene, petroleum ether, etc.

The use of water as the reaction solvent in the production gives the salt having crystal water and the use of an organic solvent gives the salt having crystal organic solvent. The properties of the salt having crystal water are almost same as the properties of the salt having crystal organic solvent. Both are heated and dried to give the salt having neither crystal water nor crystal organic solvent.

While the p-acetylaminobenzoate, being the least hygroscopic one of all the 2-dimethylaminoethanol salts previously reported, liquefies under the condition of 75.1% humidity at 37° C., the new salt remains in powder form at 97.3% humidity at 37° C. for a long period of time. In this respect, the new salt is much better than other 2-dimethylaminoethanol salts previously reported.

Also the new salt has not the bitter taste peculiar to organic base medicaments and therefore it is suitable for oral administration.

This invention will be further explained by reference to the following examples:

*Example 1*

The solution of 0.89 g. (0.01 mole) of 2-dimethylaminoethanol in 3.6 cc. of 10% hydrochloric acid is added to the solution of 3.20 g. (0.01 mole) of phenolphthalin and 0.84 g. of sodium bicarbonate in 20 cc. of water. After ice-cooling the precipitated crystals are filtered off, washed with water and dried under a reduced pressure in a desiccator. The resulting white plates are 3.65 g. of the salt of 2-dimethylaminoethanol with phenolphthalin having two moles of crystal water and melting at 211 to 212° C. (decomposition).

*Anal.*—Calcd. for $C_4H_{11}NO \cdot C_{20}H_{16}O_4 \cdot 2H_2O$: C, 64.70; H, 7.01; N, 3.14. Found: C, 64.52; H, 6.90; N, 3.10.

*Example 2*

The solution of 0.89 g. of 2-dimethylaminoethanol in 2 cc. of 99% ethanol is added to the solution of 3.20 g. of phenolphthalin in 17 cc. of 99% ethanol. After ice-cooling the precipitated crystals are filtered off, washed with ethanol and dried.

The resulting white powders or white plates are 4.35 g. of the salt of 2-dimethylaminoethanol with phenolphthalin having one mole of crystal ethanol and melting at 211 to 212° C. (decomposition).

*Anal.*—Calcd. for $C_4H_{11}NO \cdot C_{20}H_{16}O_4 \cdot C_2H_5OH$: C, 68.55; H, 7.30; N, 3.07. Found: C, 68.55; H, 7.43; N, 3.00.

*Example 3*

The solution of 0.89 g. of 2-dimethylaminoethanol in 2 cc. of methanol is added to the solution of 3.20 g. of phenolphthalin in 30 cc. of methanol. After ice-cooling the precipitated crystals are filtered off, washed with methanol and dried. The resulting white plates are 4.0 g. of the salt of 2-dimethylaminoethanol with phenolphthalin having one mole of crystal methanol and melting at 211 to 212° C. (decomposition).

*Anal.*—Calcd. for $C_4H_{11}NO \cdot C_{20}H_{16}O_4 \cdot CH_3OH$: C, 68.01; H, 7.08, N, 3.17. Found: C, 68.30; H, 6.86; N, 3.15.

*Example 4*

The solution of 0.89 g. of 2-dimethylaminoethanol in 2 cc. of acetone is added to the solution of 3.20 g. of phenolphthalin in 30 cc. of acetone. After ice-cooling the precipitated crystals are filtered off, washed with acetone and dried. The resulting white powders are 4.3 g. of the salt of 2-dimethylaminoethanol with phenolphthalin having one mole of crystal acetone and melting at 211 to 212° C. (decomposition).

*Anal.*—Calcd. for $C_4H_{11}NO \cdot C_{20}H_{16}O_4 \cdot CH_3COCH_3$: C, 69.36; H, 7.11; N, 3.00. Found: C, 69.18; H, 7.01; H, 2.98.

What is claimed is:

1. Crystalline 2-dimethylaminoethanol 4',4''-dihydroxytriphenylmethane-2-carboxylate.X wherein X is a member selected from the group consisting of $2H_2O$, $C_2H_5OH$, $CH_3OH$ and $CH_3COCH_3$.

2. 2-dimethylaminoethanol 4',4''-dihydroxytriphenylmethane-2-carboxylate.$2H_2O$.

3. 2-dimethylaminoethanol 4',4''-dihydroxytriphenylmethane-2-carboxylate.$C_2H_5OH$.

4. 2-dimethylaminoethanol 4',4''-dihydroxytriphenylmethane-2-carboxylate.$CH_3OH$.

5. 2-dimethylaminoethanol 4',4''-dihydroxytriphenylmethane-2-carboxylate.$CH_3COCH_3$.

References Cited in the file of this patent

Hanhart et al.: J. Chem. Soc. (London), (1927), page 1012.

Lecog: C. A., 41, 2346 (1947). (Copies in Library.)